US006688889B2

(12) United States Patent
Wallace et al.

(10) Patent No.: US 6,688,889 B2
(45) Date of Patent: Feb. 10, 2004

(54) COMPUTERIZED TEST PREPARATION SYSTEM EMPLOYING INDIVIDUALLY TAILORED DIAGNOSTICS AND REMEDIATION

(75) Inventors: Douglas Wallace, Dale City, CA (US); Michael Flaherty, San Francisco, CA (US); John Flaherty, Los Gatos, CA (US); Todd Huss, San Francisco, CA (US); Susan Detwiler, San Francisco, CA (US); David Roy, San Francisco, CA (US)

(73) Assignee: Boostmyscore.com, Los Gatos, CA (US)

( * ) Notice: Subject to any disclaimer, the term of this patent is extended or adjusted under 35 U.S.C. 154(b) by 162 days.

(21) Appl. No.: 09/802,312

(22) Filed: Mar. 8, 2001

(65) Prior Publication Data

US 2002/0160347 A1 Oct. 31, 2002

(51) Int. Cl.[7] .............................................. G09B 11/00
(52) U.S. Cl. ................................. 434/322; 434/307 R
(58) Field of Search ................................ 434/118, 322, 434/323, 350, 362, 365, 307 R, 236; 706/927; 705/1, 14

(56) References Cited

U.S. PATENT DOCUMENTS

| | | | |
|---|---|---|---|
| 3,715,811 A | 2/1973 | Thompson et al. ............ 35/48 |
| 4,203,452 A | 5/1980 | Cohen ........................ 128/732 |
| 4,609,358 A | 9/1986 | Sangster ..................... 434/307 |
| 4,895,518 A | * 1/1990 | Arnold et al. .............. 434/118 |
| 5,135,399 A | 8/1992 | Ryan ........................... 434/236 |
| 5,212,765 A | 5/1993 | Skeirik ......................... 395/11 |
| 5,259,766 A | 11/1993 | Sack et al. .................. 434/362 |

(List continued on next page.)

OTHER PUBLICATIONS

The TestU World Wide Web Site, (www.testu.com), More About Test U Mission Statement, Printed Apr. 25, 2000.
Scholastic Testing Systems, "Scholastic–Leveling the Playing Field for All Students," Printed Apr. 21, 2000.
The WebWare World Wide Web Site, (www.testprep.com), Printed Apr. 21, 2000.
College Entrance Examination Board, The College Board World Wide Web Site, (www.collegeboard.com), Copyright, 2000.

(List continued on next page.)

Primary Examiner—Teresa Walberg
Assistant Examiner—Kathleen M Christman
(74) Attorney, Agent, or Firm—Orrick, Herrington & Sutcliffe LLP

(57) ABSTRACT

A computerized test preparation system and methods are disclosed which assist an examinee to increase his learning and improve his performance on standardized academic or applied aptitude and achievement exams. Performance feedback information is provided to a user, including conventional information such as number of items correct and time elapsed, pinpoints substantive areas of a particular exam in which the user is either weak or strong, and offers diagnoses of, and remediation tailored to, a user's personal difficulties. By assessing a user's responses to given exam questions, through various distractor error patterns manifested in the incorrect answers to multiple-choice questions, or through coded categories of responses in the case of user responses to constrained open-ended items, a preliminary diagnosis of a user's deficits in knowledge and/or test taking skill is made. This preliminary diagnosis is subsequently refined utilizing additional examination questions. The refined diagnosis is then utilized to offer recommendations to an individual user to ameliorate the user's manifested error patterns. A user's response to this remediation is confirmed and reinforced using subsequent remediation activities.

41 Claims, 9 Drawing Sheets

U.S. PATENT DOCUMENTS

| | | | |
|---|---|---|---|
| 5,261,823 A | 11/1993 | Kurokawa | 434/323 |
| 5,267,865 A | 12/1993 | Lee et al. | 434/350 |
| 5,692,906 A | 12/1997 | Corder | 434/156 |
| 5,718,591 A | 2/1998 | Clark et al. | 434/322 |
| 5,823,781 A | 10/1998 | Hitchcock et al. | 434/118 |
| 5,823,788 A | 10/1998 | Lemelson et al. | 434/350 |
| 5,836,771 A | 11/1998 | Ho et al. | 434/362 |
| 5,885,087 A | 3/1999 | Thomas | 434/373 |
| 5,904,485 A | 5/1999 | Siefert | 434/322 |
| 5,909,589 A | 6/1999 | Parker et al. | 395/800.32 |
| 5,967,793 A | 10/1999 | Ho et al. | 434/362 |
| 5,987,443 A | 11/1999 | Nichols et al. | 706/11 |
| 5,991,595 A | 11/1999 | Romano et al. | 434/353 |
| 6,002,915 A | 12/1999 | Shimizu | 434/350 |
| 6,015,297 A | 1/2000 | Liberman | 434/322 |
| 6,018,617 A * | 1/2000 | Sweitzer et al. | 358/1.15 |
| 6,024,577 A | 2/2000 | Wadahama et al. | 434/322 |
| 6,032,141 A | 2/2000 | O'Connor et al. | 706/45 |
| 6,260,033 B1 | 7/2001 | Tatsuoka | 706/45 |
| 6,301,571 B1 | 10/2001 | Tatsuoka | 706/45 |
| 6,315,572 B1 | 11/2001 | Owens et al. | 434/322 |
| 6,427,063 B1 | 7/2002 | Cook et al. | 434/350 |
| 6,461,166 B1 | 10/2002 | Berman | 434/323 |
| 2002/0039722 A1 | 4/2002 | Lippman | 434/322 |
| 2002/0052860 A1 | 5/2002 | Geshwind | 706/62 |
| 2002/0107681 A1 | 8/2002 | Goodkovsky | 434/22 |

OTHER PUBLICATIONS

Exam Web LLC., The Exam Web World Wide Web Site, (www.examweb.com), Copyright 1998–2000.

The Writing Web, The Writing Web World Wide Web Site, (www.writingweb.com), Copyright 1997–2000.

Achieva College Prep Services, The Achieva World Wide Web Site, (www.petersons.com), Printed Apr. 21, 2000.

Educational Testing Service, The Educational Testing Service World Wide Web Site, (www.ets.org), Copyright 2000.

Alloy and Northern Light Technology Inc., The Alloy World Wide Web Site, (www.alloy.com), Copyright 1997–2000.

Edutest, Inc. The Edutest World Wide Web Site, (www.edutest.com), Copyright 2000.

Kaplan Inc., The Kaplan World Wide Web Site, (www.kaplan.com), Copyright 2000.

The myEssay World Wide Web Site, (www.myessay.com), Copyright 1997–1999.

IvyEssays, Inc., The IvyEssaysWorld Wide Web Site, (www.ivyessays.com), Copyright 1998–1999.

CollegeGate LLC., The CollegeGate World Wide Web Site, (www.collegegate.com), Apr. 25, 2000.

The Multimedia Tutorial Channel World Wide Web Site, (www.thetutorialchannel.com), Printed Apr. 25, 2000.

Act, Inc., The ACTive PrepWorld Wide Web Site, (www.act.org), Copyright 2000.

The PinkMonkey World Wide Web Site, (www.pinkmonkey.com),Copyright 1997–2000.

The College PowerPrep World Wide Web Site, (www.powerprep.com), Copyright 1996–1999.

The EmbarkWorld Wide Web Site, (www.embark.com), Copyright 1996–2000.

Business Wire, Inc., "BTG Chairman Elected to Board of Edutest.com," Feb. 24, 1999.

Business Wire, Inc., The TuttorialChannel.com, Internet Subsidiary of Multimedia Tutorial Services, Inc. Announces Plans to Acquire Educational Consulting Firm and Television Programmer, Knowledge Base, Inc.– Award Winning TV Show Rated No. 1 by Cable Television of New Jersey, Dec. 2, 1999.

Business Wire, Inc., "THCG Venture Partners I Acquires Stake in Internet—Based Test Preparation Service," Jan. 11, 2000.

Business Wire, Inc., "PinkMoney.com Begins Offering Free SAT Preparation Materials," Mar. 16, 2000.

Business Wire, Inc., "SCORE! and Pearson to Co–Develop Customized Learning Technology For Online Tutoring," Mar. 6, 2000.

The Associated Press, "College Board President Opposes Labeling Students Based on SAT Scores," Oct. 27, 1999.

Meadows, Karin, The Associated Press, "Internet Site Getting Thousands of Hits From Students Taking FCATs," Feb. 3, 2000.

Valigra, Lori, The Boston Globe, "Prepped for Success Net–Firms Pledge to Help With College Applications, But Some Question Practice," Dec. 20, 1999.

Leffal, J., The Richmond Times Dispatch, "The Three R'S and WWW," Aug. 29, 1999.

Tergesen, Anne, The McGraw–Hill Companies, Inc. Business Week, "Testing the Waters," May 24, 1999.

Gruber, R. Gary, The Washington Post, "How Will You Do On The SAT?", Sep. 14, 1998.

McDermott, E. Irene, Information Today, Inc., "Joining the Ivy League: College Resources on the Web," Feb. 1999.

Lu, Kathy, New River Editions, "Giles Students Get An Online Jump On Tests Lessons Targeted To Weakness Shown By Testing," Nov. 3, 1998.

American Society for Training & Development, Inc., "Implementing Large–Scale Training on the Internet," Jan. 1997.

* cited by examiner

COMPUTERIZED TEST PREPARATION SYSTEM EMPLOYING INDIVIDUALLY TAILORED DIAGNOSTICS AND REMEDIATION

FIELD OF THE INVENTION

The present invention relates to a computerized, or other machine based test preparation system, and more particularly, to a method and apparatus for enhancing learning and improving examinee scores on standardized exams through the use of individually tailored diagnostics and remediation.

BACKGROUND OF THE INVENTION

1. The Proliferation of "High-stakes" Examinations and Conventional Test Preparation Methods "High-stakes" examinations are very common today. Typically they are time-based exams testing a set of predetermined subject areas. A number of these examinations, such as the Scholastic Aptitude Test ("SAT") series of examinations and others like it (e.g., MCAT, LSAT, ACT, GRE, GED, CLEP, BAR exam, DMV exams), have been labeled as "high-stakes" testing. In such "high-stakes" tests, the primary objective is the placement of an examinee on a latent trait or ability dimension, for a variety of purposes such as selection and placement (i.e., SAT, MCAT or LSAT), or certification (i.e., GED and DMV exams). Most of these tests include items from a variety of scholastic domains (e.g., SAT: verbal, mathematics; LSAT: logical reasoning, reading comprehension, verbal) that are arranged in a formal structure. The test items are chosen and developed by the test makers so as to "reliably" place examinees on the latent dimension of interest to the examiner and consumers of the standardized scores from such exams.

One factor which is thought to be capable of influencing examinee performance on these tests is coaching, or formal test preparation efforts. Because of the proliferation of these "high-stakes" examinations, an entire test preparation industry has arisen to help prepare examinees and improve their scores on these exams. Offerings include classroom-based tutoring, stand-alone printed publications, and computer-based materials (e.g., disk, CD-ROM, internet). All of these offerings claim to be able to increase an examinee's score on the particular standardized exams to which they are directed.

The most conventional test preparation offerings have been traditionally represented by such organizations as Kaplan Learning and The Princeton Review study centers, or self-study methods based on printed test preparation texts such as 10 *Real SATS*, and *Gruber's Complete Preparation for the New SAT: Eighth Edition*. Through the use of such methods, examinee score increases have been modest, generally resulting in score increases on the order of ⅕th of a standard deviation.

More recently, computer based exam preparation materials have been developed and offered including The College Board's *One-on-One with the SAT*, The Princeton Review's *Inside the SAT, ACT & PSAT*, published by The Learning Company, and *The Crash Course for SAT, PSAT & ACT*, published by ARCO Publishing. Additionally, some of the testing centers mentioned above have begun offering computerized training materials generally corresponding to their traditional classroom based approach.

Common characteristics of these computerized offerings include: (i) presentation of timed "sample exams" and practice exams, (ii) scoring of responses from these exams, (iii) some question-specific feedback (e.g., response chosen, correct answer, brief explanation), and (iv) general test-taking tips (e.g., pacing, skipping questions). Features which differentiate these offerings include: (i) the use or non-use of audio and/or graphics, (ii) the ability to mark items to be skipped and returned to, (iii) feedback of a study plan based upon the results of a "sample exam", and (iv) the provision of explanations for each of the response alternatives for each item.

Several of these computerized offerings have been distributed over the internet. Some of the web sites offering exam preparation and review include: (i) Score.Kaplan.com (based on materials offered by Kaplan Learning), (ii) Review.com, (iii) Testprep.com, (iv) ACTive Prep at Act.org, (v) powerprep.com, and (vi) Novanet.com (based on materials offered by The Princeton Review). A review of these web sites as they existed in November, 2000 revealed variations in complexity from "page-turners" to relatively complete implementations of the printed volumes on which some of them are based. In general though, they reflect the same range of complexity and operation as found in the other computerized and CD-ROM offerings discussed.

Several of the web-based offerings also provide "sample exams" which can be taken by the user. Information is generally fed back to the user of such offerings in the form of raw and scaled scores. In some cases, the feedback may also include a re-presentation of the exam items, the indication of the user's response and the correct choice, and an explanation of why the correct answer is correct and why each of the alternatives are wrong. While responses to the "sample exams" in some cases provide the basis for "diagnostic" feedback, the diagnosis in this context is defined from a conventional testing perspective and is determined merely by the number of incorrect answers rather than the types of incorrect answers. Thus, a study plan, or diagnosis, if provided, is usually based upon the user's distribution of scores across the various sections of the examination and results in a simplistic recommendation of remediation, such as the need to review geometric principles or increase vocabulary.

2. Recent Development in Cognitive Diagnostic Assessments

Educators and researchers, influenced by recent developments in cognitive psychology and societal concerns regarding the influence of testing on equality of education, have sought testing instruments that would reveal the mechanisms, structures and processes that are activated when an examinee takes a test, and thus, would inform the instructional process. Conventional tests, while adequately serving as selection and/or placement instruments, are not well suited for determining a course of instruction or for identifying the source of problem-solving errors.

A category of testing called cognitively diagnostic assessment ("CDA") or dynamic testing has been developed which may provide a basis for individualized instruction for each examinee in a domain of interest. Such tests are based upon cognitive theories of learning, and as such, are not concerned with the representative sampling of items from a content domain (such as algebraic equations), but rather, with the examinee's knowledge and application of cognitive attributes which are thought to be required or not required to adequately solve a given problem. CDA testing provides information regarding the strategies that examinees use to attack problems, relationships they perceive among concepts, and principles they understand in a domain. The goal of these testing methods is to determine, on the basis of a simple test, what the strengths and weaknesses of an examinee are, relative to a specified list of cognitive attributes of interest to the teacher and the tester.

CDA-type tests are typically built around an attribute by item matrix (i.e., a Q-matrix). Thus, for an examinee to solve a given problem, it is assumed that they have knowledge of, and the ability to apply, one or more cognitive attributes related to the item or problem. The failure of an examinee to solve a problem is then attributed to the absence of a requisite cognitive attribute or to a lack of skill in its application.

The major difficulty experienced with most CDA tests is one of numerosity—the number of possible sources of error grows exponentially as the number of attributes and the number of items increase. For example, some attempts by researchers to form a Q-matrix for 60 items on the SAT math test yielded more than 3,000 prototypical error patterns. Other researchers developed models containing only 4 attributes—strategy, completeness, positivity and slips—which were proposed to be evocative of properties that could be uses in developing and interpreting diagnostic assessment tests. An evaluation of all of these models revealed that such a small universe of attributes could not adequately capture the test takers' cognitive deficiencies, while large attribute approaches were unlikely to provide a practical means of cognitive diagnostic assessment based upon simple testing.

Improvements in testing have been made possible by advancements in computer technology as well as advancements in cognitive theory. However, because there are always more ways to get an item wrong than right on a multiple-choice exam (i.e., on a typical multiple-choice question, there is only one correct answer and 3 or 4 distractors or incorrect options), or even more so, with regard to open-response, "fill-in-the-blank" questions, the specification of the cognitive model space remains a difficult task. Currently available cognitive diagnostic assessment programs are not able to handle the complexity of SAT-type examination questions.

3. Scoring of Multiple Choice and Constructed Response Examination Items

Multiple choice ("MC") tests are composed of items having two sub-parts—a stem representing the question and a series of response alternatives, one of which is the correct response. It is the presence of the response alternatives which differentiates MC test items from constructed response items which contain no response alternatives and require an examinee to self-generate a response. MC tests are typically scored by comparing the examinee's response to an item against a key that contains the correct answers. This is dichotomous scoring, 0 or 1, the answer being either correct or incorrect. Polychotomous scoring methods assign weights to each of the response options, with the correct response being given the largest weight. In practice, the two scoring methods yield highly correlated sets of test scores. Polychotomous scoring methods utilize more of the information available in a set of incorrect answers or distractors, although solely in service of the conventional testing purpose of rank ordering examinees, rather than for instruction or remediation.

Under either method, the set of response alternatives (the incorrect alternatives being known as distractors or foils) assumes considerable importance. If the distractors don't work, the test item becomes unreliable, and the interpretation of the scores becomes meaningless. Traditional methods of test construction have focused on the selection of distractors that are thought to yield some information about the latent trait being evaluated and on the elimination of non-working distractors. Conventionally, information derived from incorrect responses to an exam question is solely used by test developers to indicate that the question needs improvement, either in the wording of the stem or in the specification of the response alternatives. Nonetheless, additional useful information about the examinee can be captured from these incorrect answers. Researchers have observed that classification of response option choice according to type of error could be utilized for diagnostic purposes. Nevertheless, significant attention has not been directed toward developing MC tests in which the response alternatives are scored diagnostically for the benefit of the examinee and examiner.

Constructed response items, such as short answer or essay questions, typically require a person knowledgeable in the domain being tested to score such response items. Constrained constructed response items, such as the grid-in items on SAT-type examinations, may now be computer scored as the software programs are capable of accepting a range of responses as being correct. The scoring routines employed for a majority of high stakes examinations are still designed to yield scores based on a binary correct/incorrect coding of responses. Programs for the scoring of responses to extended essay questions are still in the investigatory stage.

4. Disadvantages of the Prior Art

Known methods of preparing examinees for "high-stakes" exams are costly; fail to hold the interest of the examinee, and are inefficient and inconvenient. Furthermore, these current methods generally provide a low return on an examinee's investment, both financially and mentally. Reviews of research on admissions test coaching indicated that score increases are on the order of ⅕th of a standard deviation.

More importantly, since the current methods of test preparation remain wedded to the traditional concept of ranking each examinee against another on a latent dimension using scaled scores, the failure of an examinee to achieve a "satisfactory score" (as either defined by a school or other agency, or self-defined) results in a course of remediation limited to simple recommendations of more practice in a particular area; a method of remediation which is only weakly, if at all, informed by the test-taking experience. Feedback to the user which is based on such conventional test considerations does little to facilitate learning or improvement in knowledge in the domain of study.

Known test preparation systems also do not provide for the cognitive diagnosis of test-taking and/or content-related problems. Recommendations for remediation are based on the overall frequency of wrong answers in specific domains of a test, rather than on the frequency of specific types of wrong answers.

Furthermore, current systems do not permit the user to adapt the study program so that it is maximally effective for the particular user. Users who are visually oriented and learn most effectively from graphical presentations are provided no different manner of instruction than those users who are aurally oriented and who would benefit more from spoken explanations.

Finally, while mentoring, or one-on-one tutoring, remedy many of the shortcomings in these conventional test preparation methods, and while use of these methods is perhaps the most effective manner of diagnosing learning difficulties and effecting remedial action, individual mentoring is very costly and qualified mentors are limited in numbers and availability. Thus, once again, neither of these options are viable solutions for facilitating improvement in examinee scores on standardized tests in a commercially reasonable manner.

OBJECTS AND SUMMARY OF THE INVENTION

The invention provides an apparatus and method for enhancing learning and improving examinee test scores on standardized tests using cognitive diagnostic principles of diagnosis and remediation. More specifically, the invention provides a comprehensive, self-contained system for assessing and preliminarily diagnosing patterns of examinee errors through the use of data from the incorrect response alternatives (distractors) presented in each multiple-choice exam question or presented in response to constrained open-ended exam questions, confirming the preliminary diagnosis, if necessary, through the use of subsequent examination, offering remediation based upon the diagnosed error patterns, and reinforcing this remediation through skill development exercises, in order to increase an examinee's learning and level of performance on standardized tests. According to one embodiment, the invention utilizes information inherent in the distractors in standardized multiple-choice tests. According to another embodiment, the invention utilizes information provided as responses to constrained open-ended exam questions, in which the stem of such questions mirrors those employed in standardized multiple-choice tests. A system incorporating either of these embodiments does not require the creation of new test questions or responses. According to another embodiment, specific distractors are included in evaluation examinations that provide additional insight and information in identifying problem solving deficiencies. According to another embodiment of the invention, coded categories of responses that correspond to user generated response items are employed to provide information analogous to that provided by the distractors in standardized multiple-choice tests.

A system designed according to one embodiment of the invention incorporates several different program components. Those components may include a user interface, a test generator, a diagnostic scoring component, and a remediation component. The user interface manages a user's interaction with the system, requests and stores various personal information with respect to the user, and allows the system to be specifically tailored to the individual user. The test generation component compiles and formats various types of examinations for provision to the user, such as diagnostic sample tests, non-diagnostic test-taking strategy tests, and basic skill tests, and presents the examinations to the user for completion, storing a variety of information with regard to the user's responses to the exam. The diagnostic component assesses and diagnoses (both preliminarily and through a more informed manner) a user's error patterns in connection with the tests generated from the test generation component. The remediation component employs diagnoses from the diagnostic component to recommend remedial activities for improving examinee test performance and scores. The remediation component additionally contains a number of features that, in connection with the user interface component, allow the system to be specifically tailored to an individual user. Such features include the designation of materials for specific types of presentation, scrolling and bookmarking of materials, the presentation of difficulty meter levels, and the use of various multi-media features for presentation of remediation materials.

The systems and methods according to one aspect of the invention identify patterns of errors in a user's choice of distractors contained within current standardized tests, and provide individually tailored remedial activities selected and based on such patterns. According to another aspect of the invention, test questions are developed which have stems and correct answers that are parallel to current standardized tests, but which have distractors that are designed to identify specific problem solving errors. According to yet another aspect of the invention, questions are developed independent of current standardized tests, and which have distractors designed to identify specific cognitive errors. Analysis of the selection of incorrect and correct answers is used to develop an individualized program of remediation.

According to an embodiment of the invention wherein current published standardized tests are used to compile the exam questions by the test generation component, the content and format of a particular test determines the overall number of distractor codes that are assigned. Since many standardized tests have been developed using a variety of item analysis techniques, the items and associated distractors which comprise the final versions of these tests are considered to be effective at assessing the examinee's knowledge of the content domain. Thus, a system according to the present invention needs only to determine the information value of the incorrect responses and to assign category codes that reflect the probable error type made by an examinee that chose the incorrect alternative for tests of this type. According to another embodiment wherein exam items are generated which are specifically tailored to assess a user's response to specified distractor codes, a more detailed range of codes can be assigned.

Known test preparation systems do not provide for the diagnosis of error patterns that exist in an user's choice of incorrect response alternatives, and thus do not have the capability of recommending a course of remediation and/or skill development on the basis of a user's having responded to a sample standardized test in which the response options were not only scored as correct or incorrect, but also in terms of the types of errors they represent.

In light of the limitations of known tests preparation systems and methods, it is an object of the invention to provide a more efficient, convenient, and effective manner of enhancing learning and improving test scores for a variety of "high stakes" examinations. It is another object of the present invention to provide a test preparation system and method wherein an examinee's error patterns with respect to incorrect responses to exam questions are assessed and the examinee's cognitive deficiencies diagnosed, and, using this information, recommendations are made for remedial activities targeted to the individual examinee.

Another object of the present invention is to provide a system and method for teaching "testwiseness" skills, or skills which incorporate the use of cues provided by the test itself, or which are obtained by knowledge of the propensities of the test maker, to arrive at correct answer to exam questions without possessing an underlying knowledge of how and why a particular answer is correct.

The various aspects of the invention discussed above may also be combined in various ways to produce additional advantages of the invention over known systems and methods. For example, the present invention may be used to provide for remedial training and/or skill development informed by the assessment of an individual examinee's error patterns, provided at a customer's site. The present invention may also provide for a flexible presentation of test contents and materials, in both visual and audio form, tailored to the unique needs of a particular examinee as chosen by the examinee himself. In addition, further objects and advantages afforded by the present invention will be apparent from the detailed description hereinbelow.

BRIEF DESCRIPTION OF THE DRAWINGS

The appended drawings are presented to further describe the present invention and to assist in its understanding through clarification of its various aspects. The features, characteristics and advantages discussed above, as well as other features, characteristics and advantages of the invention, will be apparent to a person of ordinary skill in the art upon consideration of the following detailed description, taken in conjunction with the accompanying drawings, in which.

DETAILED DESCRIPTION OF THE INVENTION

Figure 1:
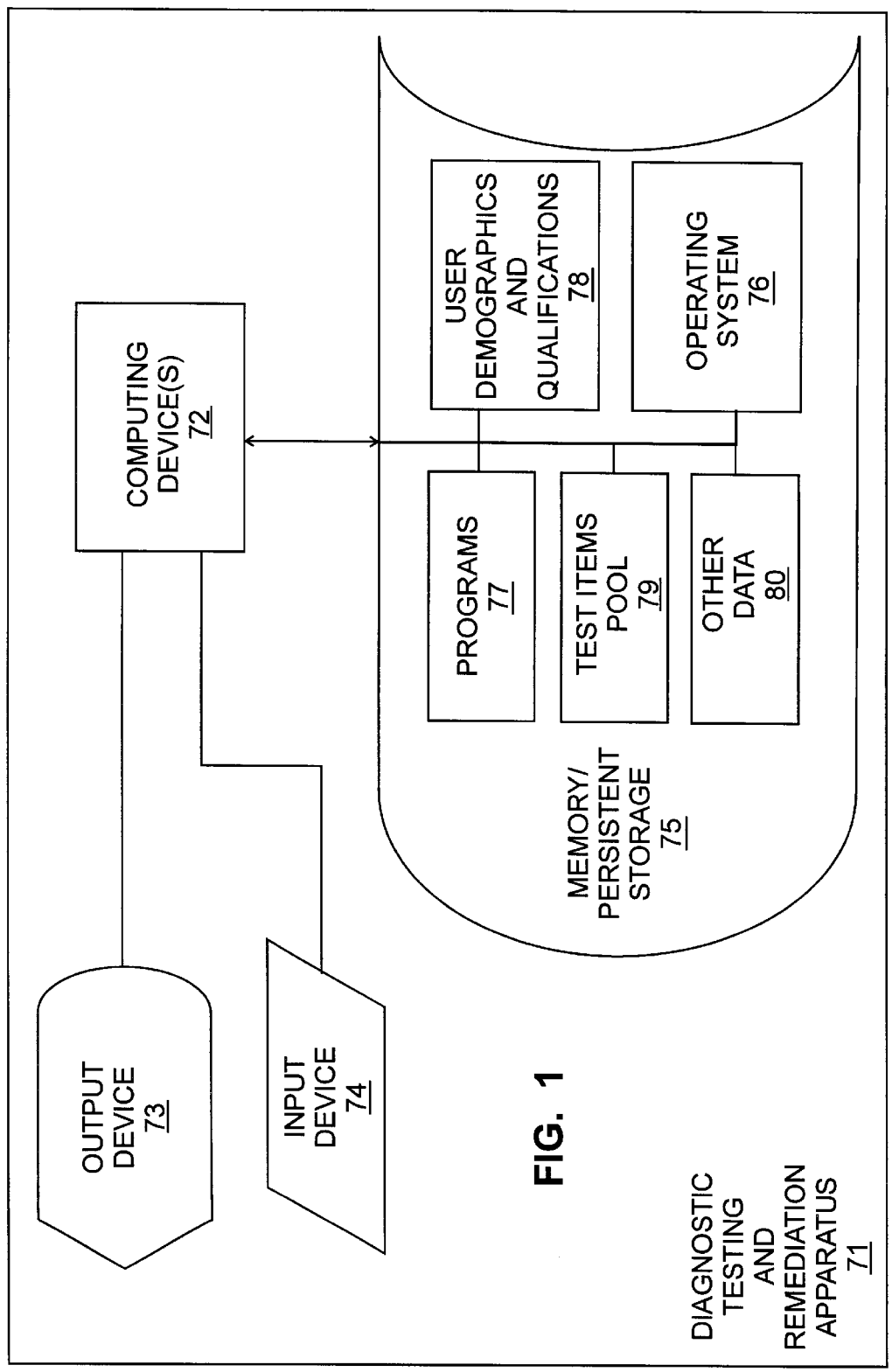
FIG. 1 illustrates a block diagram of an embodiment of a diagnostic testing and remediation system according to the invention.

FIG. 1 is a block diagram of an embodiment of a diagnostic testing and remediation system according to the present invention. An apparatus implementing the present invention may take multiple forms depending on the configuration of the components. The system includes a Computing Device 72 which may be local (e.g., desktop) or remote (e.g., networked, internet, intranet), an Output Device 73, which may be a CRT, flat panel, and/or other similar display device or projector, an Input Device 74, which may take the form of a keyboard, pressure sensitive switch panel, voice recognition system, biometric sensor and/or other similar device, and a Memory/Persistent Storage System 75 which may be local, as in a diskette, DVD/CD-ROM, or hard drive, or remote.

The Memory/Persistent Storage System 75 stores various additional components which can be utilized in implementing the system, such as the Operating System 76, Programming 77, User Demographics and Qualifications 78, Test Item Pool 79, and Other Data 80. The Operating System 76 may include Windows/DOS, MAC-OS, Linux, and other like computer operating systems. The User Demographics and Qualifications Component 78 may include information about one or more examinees such as gender, age, grade level, prior test and test preparation experiences and the like. The system according to the invention may use the information in the User Demographics and Qualifications Component 78 to make appropriate recommendations and personalize test item materials.

The Test Item Pool 79 contains test items that are utilized to create a variety of multiple-choice tests. Each test item has descriptor codes associated with it that indicate, among other things, the item's domain, format, difficulty level or error category. The Other Data Component 80 may include an examinee's responses to diagnostic tests previously administered by the system. The Programs Component 77 may include multiple components as illustrated in FIGS. 2–5 which, according to one embodiment of the invention, substantially establish and implement the test preparation system.

Figure 2:
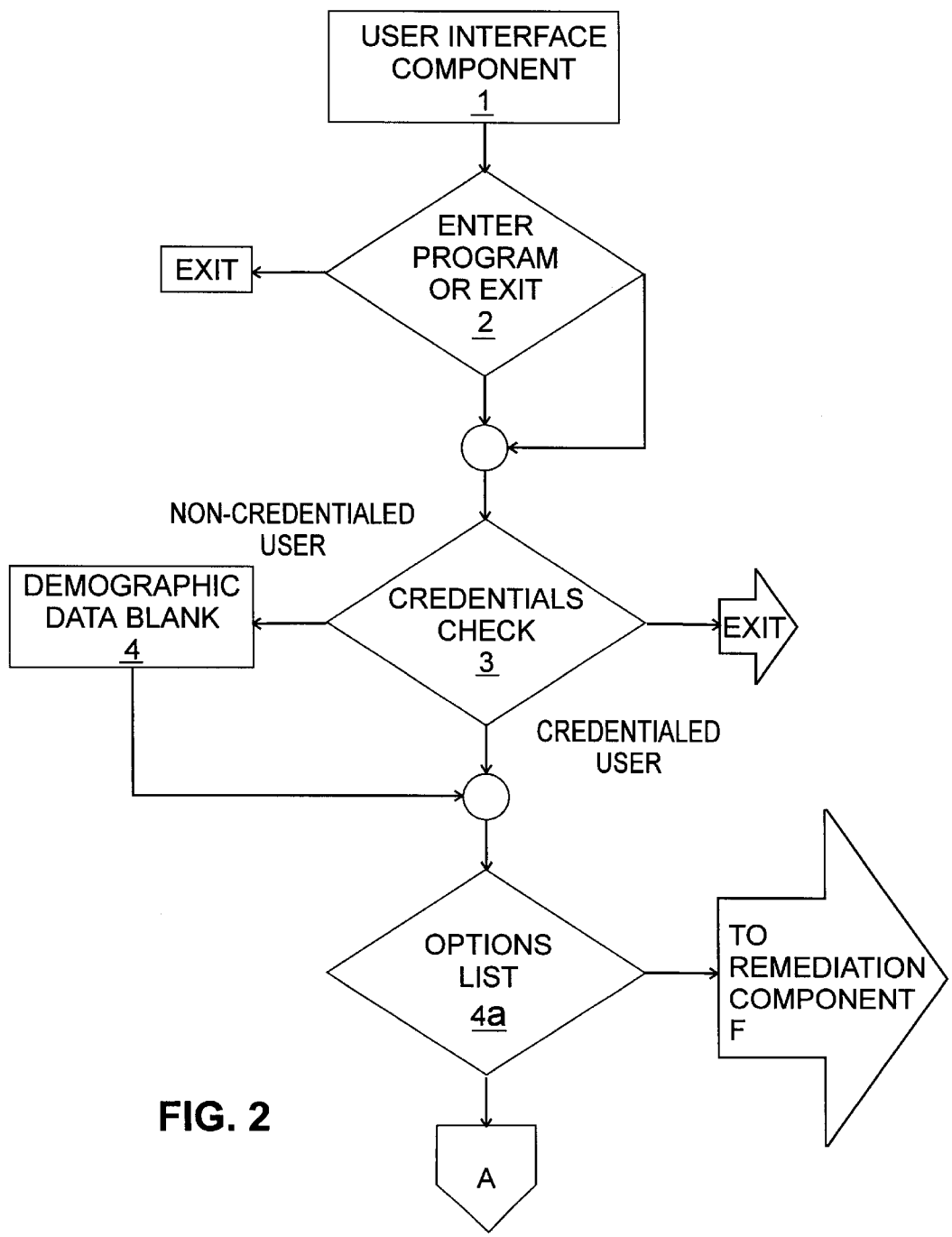
FIG. 2 illustrates a block diagram of the user interface component according to the invention.

The User Interface Component 1, shown in detail in FIG. 2, manages the user interaction with the system and may perform such functions as credentialing and the display of various system options. The Test Generation Component 10, shown in detail in FIG. 3, compiles and formats one or more tests by assembling test items from the Test Item Pool 79. Various types of tests may be created by the Test Generation Component 10, including Diagnostic Sample Tests, which are formatted and timed as an analog of standardized paper and pencil tests, Test-taking Strategy Tests, which assess knowledge of test taking strategies and skill in their application (including testwiseness of the user), and Basic Skills Tests, which assess knowledge of basic facts in the domains being tested. Test items comprise a test question and an answer set including at least one correct and one incorrect answer. Alternatively, the tests generated by the Test Generation Component 10 include test items that comprise a question designed to elicit a constrained open-ended response from the test taker. Such items may consist of the stem portions of analogous MC items. Accordingly, in such circumstances, the answer set for these constrained open-ended items will contain at least one correct answer and multiple incorrect answers.

Figure 3:
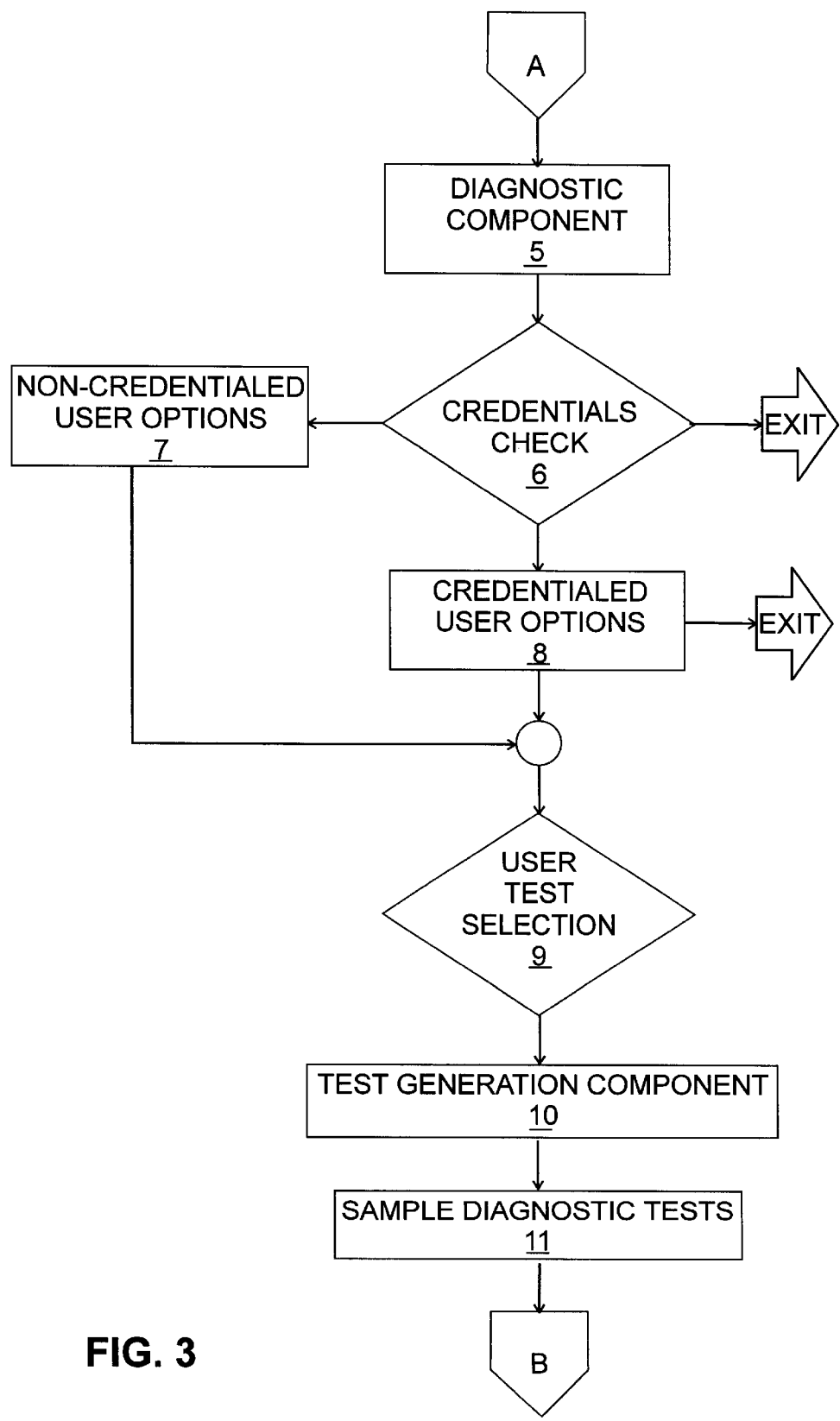
FIG. 3 illustrates a block diagram demonstrating the interaction between the user interface component, the remediation component and the test generation component according to the invention.

The Testing Component 5 shown in FIG. 3, utilizes user choices on exam questions, information about the test items used to assemble the exam and user demographic data to develop one or more diagnoses to be used as a basis for making recommendations for remediation activities. When the tests generated by the Test Generation Component 10 include test items that comprise questions designed to elicit a constrained opened-ended response from the test taker, information about the test items and user demographic data may still be employed to develop one or more diagnoses to be used as a basis for making recommendations for remediation activities. According to an embodiment where the constrained open-ended items consist of the stem portions of analogous MC items, the identical item information that is available for the MC items is available for the constrained open-ended items. The Remediation Component 47(a) shown in FIG. 7 employs diagnoses from the Diagnostic Component 5 and the Scoring Diagnostic Component 29, in conjunction with the Test Generation Component 10, to recommend and provide remedial activities, including recommended reading, suggested study materials, practice tests and the like.

FIGS. 2 and 3 are block diagrams of the User Interface Component according to the invention and illustrate the interaction between the User Interface Component 1, the Remediation Component 47a and the Test Generation Component 10. In one embodiment, the User Interface Component 1 manages the user's interaction with the system and may perform such functions as credentialing and the display of various options offered by the system. The User Interface Component 1 begins by displaying an option 2 to the user to enter or exit the program. If the user chooses to enter the program, a Credentials Check 3 is completed to determine if the user is a former or new user and whether the Demographic Data Blank 4 still requires completion. This information is required so as to provide an appropriate or optimal listing of options 4a available to the user; to provide data to the Test Generation Component 10 so that appropriate tests may be constructed; and to provide data to the Remediation Component 47a so that appropriate weights may be applied to test generation and to the creation of feedback screens.

Additionally, the Demographic Data Blank 4 requests information regarding age, gender, objectives, interests and the like so that certain test items may be personalized; and information regarding prior test-taking experience so that diagnostic recommendations 48 may be appropriately weighted. Once the Credential Check 3 has been completed, the user is presented with an Options List 4a. According to one embodiment, the user is allowed to select either Sample Diagnostic Tests 11 or go directly to the Remediation Component 47a for skills development. If the Sample Diagnostic Tests 11 are chosen, the Test Generation Component 10 provides the user with a selection of Sample Diagnostic Tests 11 that are either computer based analogs of the standard paper and pencil versions, or tests which have been specifically developed by the system to determine a user's errors in reasoning. The user is informed that once the Sample Diagnostic Tests 11 are completed, appropriate remediation activities will be recommended.

A second Credential Check 6 permits the display of the appropriate set of options available to the user and the requirements for the various levels of diagnostic feedback. For those users who have not completed the requisite number of items on the Demographic Data Blank 4 to permit the full implementation of the diagnostic recommendation 48 and feedback 61 processes, a Non-Credentialed User Options List 7 is available. For those users who have completed a requisite number of items on the Demographic Data Blank 4 so that a full implementation of the diagnostic recommendation 48 and feedback 61 processes are possible, a separate Credentialed User Option List 8 is presented.

Once the user encounters either Option List 7, 8, the user is provided a choice 9 of available Sample Diagnostic Tests 11 for selection. Once the user chooses from the available Sample Diagnostic Tests 11, the Test Generation Component 10 controls the item selection, item formatting, and test presentation for the user selected Sample Diagnostic Test 11. According to one embodiment, the Sample Diagnostic Tests 11 are designed to diagnose of areas of content and test taking proficiency which require improvement. The Sample Diagnostic Tests 11 provide the basis for a preliminary diagnosis of types of user errors and for remedial recommendations. According to one embodiment, the Sample Diagnostic Tests 11 are taken under conditions simulating the "real-life" exams.

According to another embodiment, the Sample Diagnostic Tests 11 are generated using specifically designed questions and response alternatives to implement the concept of adaptive remediation. According to this embodiment, for items of equal difficulty level and content, the response alternatives are varied to diagnose sensitivity to varied distractors, and thus, diagnose specified errors of reasoning. Sample Diagnostic Tests 11, according to this embodiment, do not rely on the limited set of distractors contained in the standard exams. Analysis of the selection of response alternatives allows a system according to this embodiment of the invention to accurately determine the user's level of knowledge for a particular content domain efficiently (i.e., using the least number of questions). According to a further embodiment, the test item pool is stratified by item difficulty level and the program algorithm selects subsequent items from the pool in accordance with the prior responses.

According to a further embodiment where constrained open-ended items are employed which consist of the stem portions of analogous MC items, the difficulty level information that is available for the analogous MC items will also be available for the selection of constrained open-ended items for use in the Sample Diagnostic Tests 11.

Figure 4:
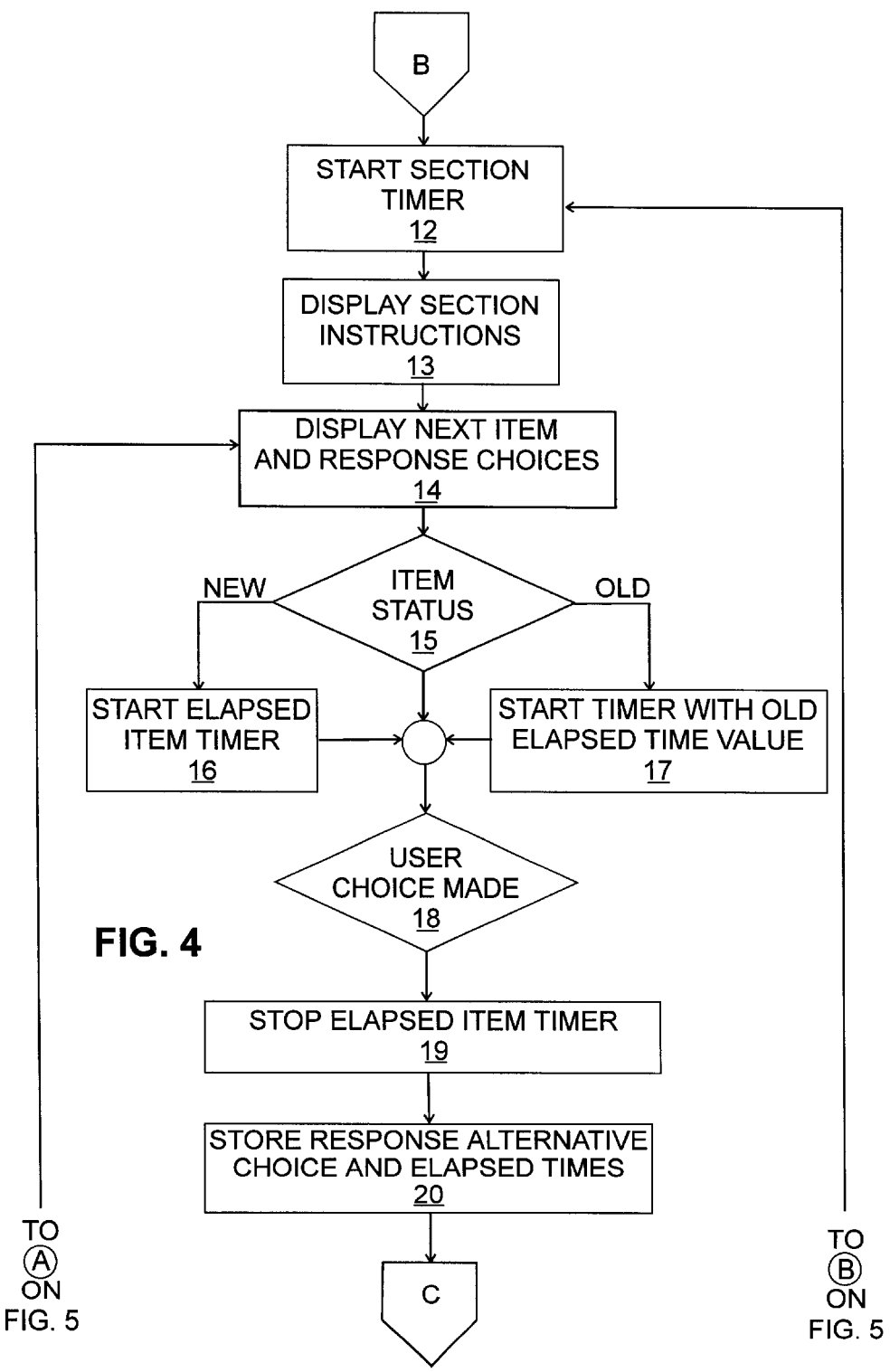
FIG. 4 illustrates a block diagram of the test generation component according to the invention.
Figure 5:
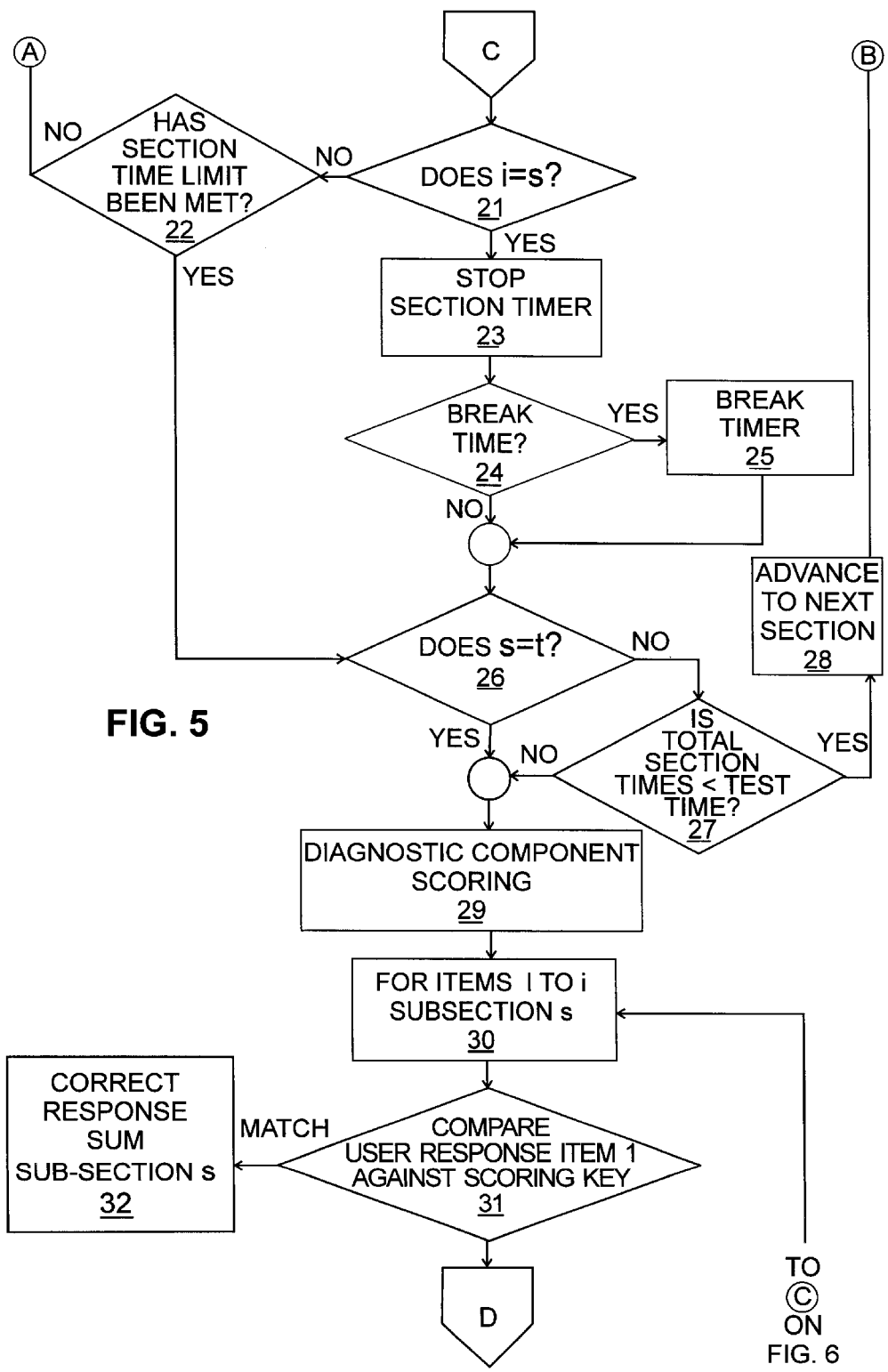
FIG. 5 illustrates a block diagram demonstrating the interaction between the test generation component and the diagnostic component according to the invention.

FIGS. 4 and 5 are block diagrams of the Test Generation Component 10 according to the invention and the interaction between the Test Generation Component 10 and the Diagnostic Component 5, 29 according to an embodiment of the invention. As demonstrated in FIG. 4, after the user has selected the Sample Diagnostic Test 11 at step 9 and the Sample Diagnostic Test 11 has been generated at step 10, a test section timer 12 is started and any applicable section instructions and sample problems are displayed 13. Once the user elects to continue, the first test item is displayed along with its response alternatives 14. The test item status is assessed as each test item is displayed, as either new or old (previously displayed in a given session) 15 so as to appropriately set the item elapsed timer 16, 17. For new items, the item elapsed timer 16 is started at zero. For old items previously displayed, the item elapsed timer 17 continues from the time elapsed during the previous display. Once again, the user may choose from among the response alternatives 18, including the choice to bookmark a particular item for later consideration if time permits. Once the user has made a choice 18, the elapsed item timer stops 19, and the user's response and elapsed time are recorded 20.

In one embodiment, for each item completed, the program assesses 21 whether the number of items completed "i" equals the number of items in a given sub-section "s", and if not, the program inquires if the time limit for a sub-section has been met 22. If the time limit 22 has not been exceeded, another item 14 is presented. If the number of items completed "i" equals the total number of items in the section or sub-section "s", or the section time limit 22 has been met, the section timer is stopped 23. Once the section timer is stopped 23, the program assesses whether it is appropriate to permit an authorized break from the test 24. If an authorized break is permitted, the break timer 25 times the duration of the authorized break from the test and notifies the user when to resume the test.

In one embodiment, if no break was authorized or the authorized break is completed, the program assesses 26 whether the number of sections in the exam completed "c" equals the total number of sections in the exam "t". In another embodiment, the program also assesses 27 whether the sum of the times for the completed sessions exceeds the total time allowed for the test. If the number of completed sections "c" equals the number of total sections "t" in the exam, or the total times for the completed sessions equals or exceeds the total allowable time, the program continues onto the Diagnostic Component 5, 29. If the sum of the times for the completed sections does not exceed the total time allowed for the test 27, and if the number of completed sections "c" does not equal the total number of sections in the exam "t", the next section of the exam is presented 28.

Figure 6:
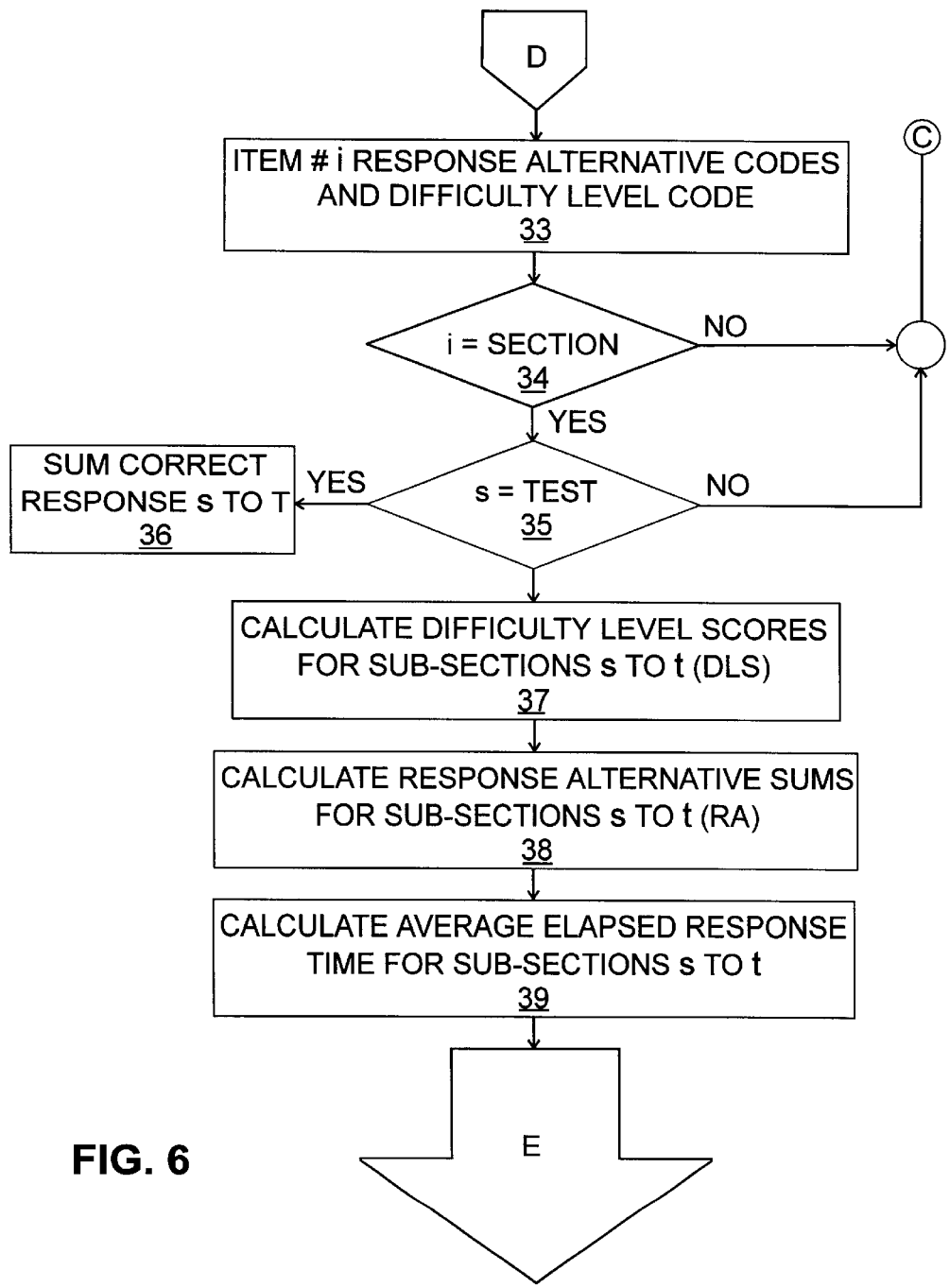
FIG. 6 illustrates a block diagram of the implementation of the diagnostic component according to the invention.
Figure 7:
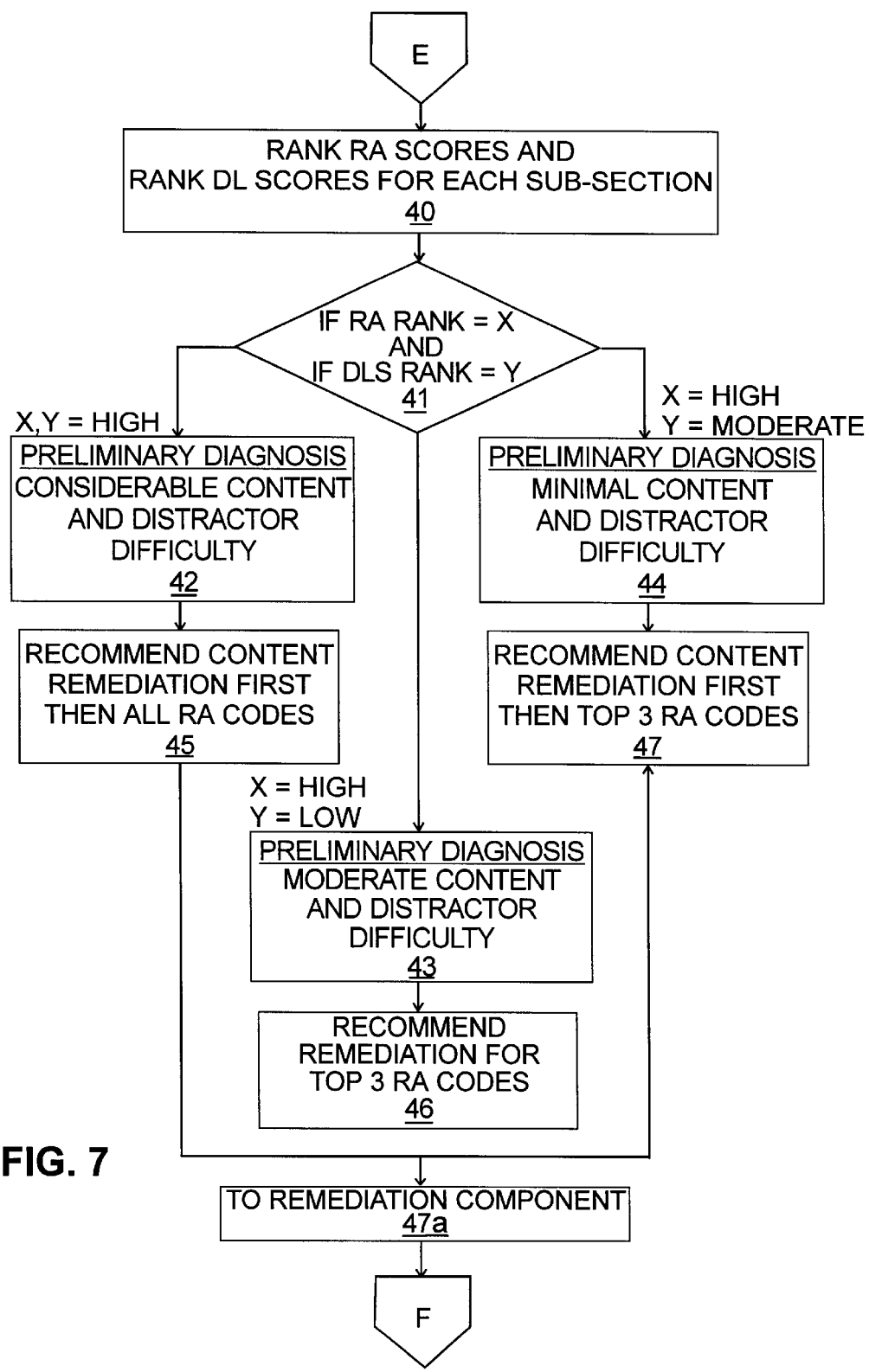
FIG. 7 illustrates a block diagram of a further embodiment of the diagnostic component according to the invention, wherein the interaction between the diagnostic component and the remediation component according to the invention is illustrated.

FIGS. 5, 6 and 7 are block diagram of the Scoring Diagnostic Component 29 and the interaction between the Scoring Diagnostic Component 29 and the Remediation Component 47a according to an embodiment of the invention. The Scoring Diagnostic Component 29 utilizes user responses to test items and test item information to formulate a preliminary diagnosis of content areas and test taking behavior needing remediation. This component also includes the scoring routines for the Sample Diagnostic Tests 11.

The program gathers the user responses and item information on an item-by-item basis for each sub-section "s" of a test 30. The user response to an item is compared to a scoring key 31 and if the two match, the total number of correct items for a sub-section "s" is incremented 32. This continues until all user responses are compared with all items in a particular sub-section "s" and the number of correct responses is totaled 32. Additionally, for each item within a given sub-section "s", the response alternative codes and item difficulty level codes are retrieved 33. User responses to each item are summed as to the values corresponding to the response alternative codes 38 and difficulty level 37. The program continues this assessment and scores additional items until the sub-section "s" is complete 34, 35. The program continues the scoring assessment for each sub-section "s" until the test is complete and no sub-sections "s" remain 34, 35. Once the test scoring is complete, the sub-section "s" scores are summed to determine the total test score "T" 36. Additionally, the averaged elapsed time is calculated for each sub-section of the sample test 39 and this time is used, along with variability in item elapsed times, to assess the user's time management skills.

According to one embodiment of the invention, the program calculates the Difficulty Level ("DL") scores for each sub-section of the test 37. DL scores are calculated by using the difficulty level code for each item for which the user made an incorrect response choice. For example, on the SAT examination, there are three item difficulty levels—easy, moderate and difficult—each containing approximately one-third of the items in a given sub-section. One implementation of differential weighting is to assign the values of 5, 3, and 1 to these levels respectively. Hence, an incorrect response to three easy items yields a DL score of 15, while an incorrect response to three difficult items yields a DL score of 3. This differential weighting of incorrect items assumes that users who miss easy items are in greater need of remediation and/or skill development than are those users that correctly answer the easy items and primarily miss the more difficult ones. The difficulty levels shown in this embodiment of the invention are given by way of illustration. Greater or fewer numbers of difficulty levels may be assigned and the method of weighting such levels may vary. Further, the calculation of overall DL scores may be made using a different algorithm than that shown here yet still remain within the scope of the invention.

According to an embodiment where constrained open-ended items are employed which consist of the stem portions of analogous MC items, the item difficulty level information that is available for the MC items is also available for the constrained open-ended items, although the calculation of the overall DL scores for the constrained open-ended items is made using a different algorithm. The overall DL scores for the MC items and the constrained open-ended items can also differ as a consequence of differential weightings and or combinatorial algorithms being employed.

According to another embodiment of the invention, the program calculates and sums the Response Alternative ("RA") scores across all of the items in each sub-section of the test 38. RA's are codes that are assigned to each response alternative and are indicative of a particular distractor type. RA scores permit the determination of user sensitivity to different distractors which, by definition, constitute wrong choices. Correct alternatives may also receive a code since they also may be a distractor or incorrect choice when used in a different exam question. According to one alternative to this embodiment, RA scores are implemented as the frequency with which a particular code is chosen across all items within a test sub-section. According to an alternative embodiment, a weighting scheme or another alternate scoring method known to those of ordinary skill in the field of the invention may be used to assess the RA scores.

According to an embodiment where constrained open-ended items are employed which consist of the stem portions of analogous MC items, the item information that is available for the MC items is also available for the constrained open-ended items. In this regard, the RA codes that are applicable to the MC items are also applicable to the constrained open-ended items. The set of analogous MC RA codes is expandable in its range to encompass the greater variability of responses to constrained open-ended items. Thus, while the MC items may have one correct response RA code and four incorrect alternative RA codes, the constrained open-ended items will have at least one correct response RA code and multiple incorrect alternative RA codes, which codes are applicable to a range of response values.

By way of example, several subtraction problems can be considered: (1) 21–10, (2) 21–11, and (3) 21–12. Students learning two place subtraction may encounter difficulty when the problem requires manipulation of the tens and units values (i.e., "borrowing", as when the problem becomes 21 take away 12). According to one embodiment of the invention, a student who displays a pattern of correct responses to test items that do not require borrowing (e.g., 21 take away 11) and incorrect responses to those test items that do, is preliminarily diagnosed as having an incorrect or non-existent model of borrowing. According to this embodiment, a more accurate diagnosis of the two-place subtraction error is made upon subsequent testing focused specifically on that problem. The reliability of this diagnosis is partially dependent upon the number of items in the assessment. According to this embodiment, the two-place subtraction problem error is diagnosed by presenting the user with test items designed to reveal this error, and once this error is diagnosed, the examinee is instructed in the concept of borrowing, and the examinee is presented with practice items that exercise this particular skill.

Several additional questions are presented below by way of example to demonstrate the analysis of RA scores across a variety of disciplines prior to the assignment of RA codes:

1. Sentence Completion (a.k.a. Fill in the Blank)

Sample Question: The psychologist set up the experiment to test the rat's _____ ; he wished to see how well the rat adjusted to the changing conditions it had to face.

A user understanding the question would search for an answer that is logically related to the concept of "adjustment to change".

(1) Incorrect Answer A: reflexes
  RA analysis: This answer is erroneously related to "test" as in "test of reflexes"; this answer is not logically related to adjustment to change;
(2) Incorrect Answer B: communicability
  RA analysis: This answer is also not logically related to adjustment to change;
(3) Incorrect Answer C: stamina
  RA analysis: This answer is erroneously related to "see how well"; It is not logically related to adjustment to change;
(4) Incorrect Answer D: sociability
  RA analysis: This answer is not logically related to adjustment to change;
(5) Correct Answer E: adaptability
  RA analysis: This answer means adjustment to change.

According to an embodiment where a constrained open-ended item is employed consisting of the stem portion of an analogous MC item, the item would read the same and the examinee would be requested to enter an appropriate word (s) in the blank. Since the stem for the constrained open-ended item is the same as that for the MC format item, the same set of response alternatives is applicable. An expanded range of response alternatives can be employed for the open-ended items so as to permit the use of synonyms. The RA analysis of the user-generated responses would parallel that of the MC items. Incorrect distractors for the MC items, if given in response to the constrained open-ended items, would be assigned the same codes. Incorrect distractor synonyms would also be assigned the same codes as the initial distractor.

2. Analogies

Sample Question: FISH: TROUT as _____ : _____

A user understanding this question would search for an answer in which the first item represents a class and the second item represents a member of the specified class.

(1) Incorrect Answer A: Ocean: Wave
RA analysis: This answer illustrates a part to a whole;
(2) Correct Answer B: Mammal: Whale
RA analysis: This answer illustrates a class and a member;
(3) Incorrect Answer C: Bird: Aviary
RA analysis: This answer illustrates a defining characteristic of an item;
(4) Incorrect Answer D: Antenna: Insect
RA analysis: This answer illustrates a part to a whole;
(5) Incorrect Answer E: Stag: Doe
RA analysis: This answer illustrates a gender and its antonym.

3. Mathematics

Sample Question: If $(2+x)/(5+x) = 2/5 + 2/5$, then $x = ?$

A user understanding this question would search for an answer obtained by means of addition and simplification of the terms.

(1) Incorrect Answer A: $2/5$
RA analysis: The answer is a simple eye-catcher option which is faulty;
(2) Incorrect Answer B: 1
RA analysis: The answer was not obtained through addition and simplification;
(3) Incorrect Answer C: 2
RA analysis: The answer was obtained through repetition of a number in the stem, generally a wrong choice;
(4) Incorrect Answer D: 5
RA analysis: The answer was obtained through repetition of a number in the stem, generally a wrong choice;
(5) Correct Answer E: 10
RA analysis: The answer was obtained through addition and simplification.

According to an embodiment of the invention as illustrated in FIGS. 6 and 7, the program calculates the DL scores 37, RA scores 38, and averaged elapsed response time 39 for sub-sections "s" to "t" completed by the user. The RA scores and DL scores are separately rank-ordered 40 for each sub-section "s" of the sample diagnostic test. The program determines the relative rankings of the RA and DL scores 41. If both are high on the given scale, indicating that the user incorrectly responded to many "easy" items using several incorrect response alternatives, then a preliminary diagnosis 42, 45 is made to remediate both content and awareness of distractor types. If the RA scores are high and the DL scores are moderate on the given scale, then a preliminary diagnosis 43, 46 of moderate levels of remediation of both content and awareness of distractor types is made. Finally, if RA scores are moderate to high, and DL scores are low on the given scale, then a preliminary diagnosis 44, 47 is made of minimal content and distractor difficulty; a diagnosis which is expected from users obtaining high test scores.

The preliminary diagnostic recommendations 45–47 are based on data that may be displayed in a two-dimensional frequency chart—item by response alternative types with the items being grouped by difficulty level. An example of such a chart is shown in Table 1 below:

TABLE 1

| Item Difficulty Wt. | Item # | 1 | 2 | 3 | 4 | 5 | 6 | ... | DLS |
|---|---|---|---|---|---|---|---|---|---|
| 5 (Easy) | 1 | 1 | | | | | | | — |
|  | 2 | 1 | | | | | | | 15 |
|  | 3 | | | 1 | | | | | — |
|  | 4 | | | | | | | | — |
| 3 (Mid) | 5 | | | | 1 | | | | 6 |
|  | 6 | | | | | | 1 | | — |
|  | 7 | | | 1 | | | | | — |
| 1 (Hard) | 8 | 1 | | | 1 | | | | 3 |
|  | 9 | | | | | | | | — |
| Sum RA |  | 11 | 0 | 6 | 4 | 0 | 3 | | |

The chart above indicates that the user chose response alternative coded 1 for item number 1, response alternative coded 1 for item number 2, response alternative coded 3 for item number 3, and so on. For each of the three items, the choices made were incorrect. Note that the correct alternative code for each of the items is not indicated in the chart and according to this embodiment, scoring is based only on incorrect responses selected. Alternatively, the correct answers could also be ranked on the chart shown in Table 1. Furthermore, while only one method of ranking is presented above, many others methods of ranking can be used, as would be understood by one skilled in the field of the invention. According to an embodiment where constrained open-ended items are employed which consist of the stem portions of analogous MC items, the difficulty levels of the stem-equivalent items will be equivalent to those assigned to the MC items and the constrained open-ended items will share an overlapping set of RAs. However, the constrained open-ended items will be assigned a larger number of RAs so as to encompass a larger range of user-generated responses.

Figure 8:
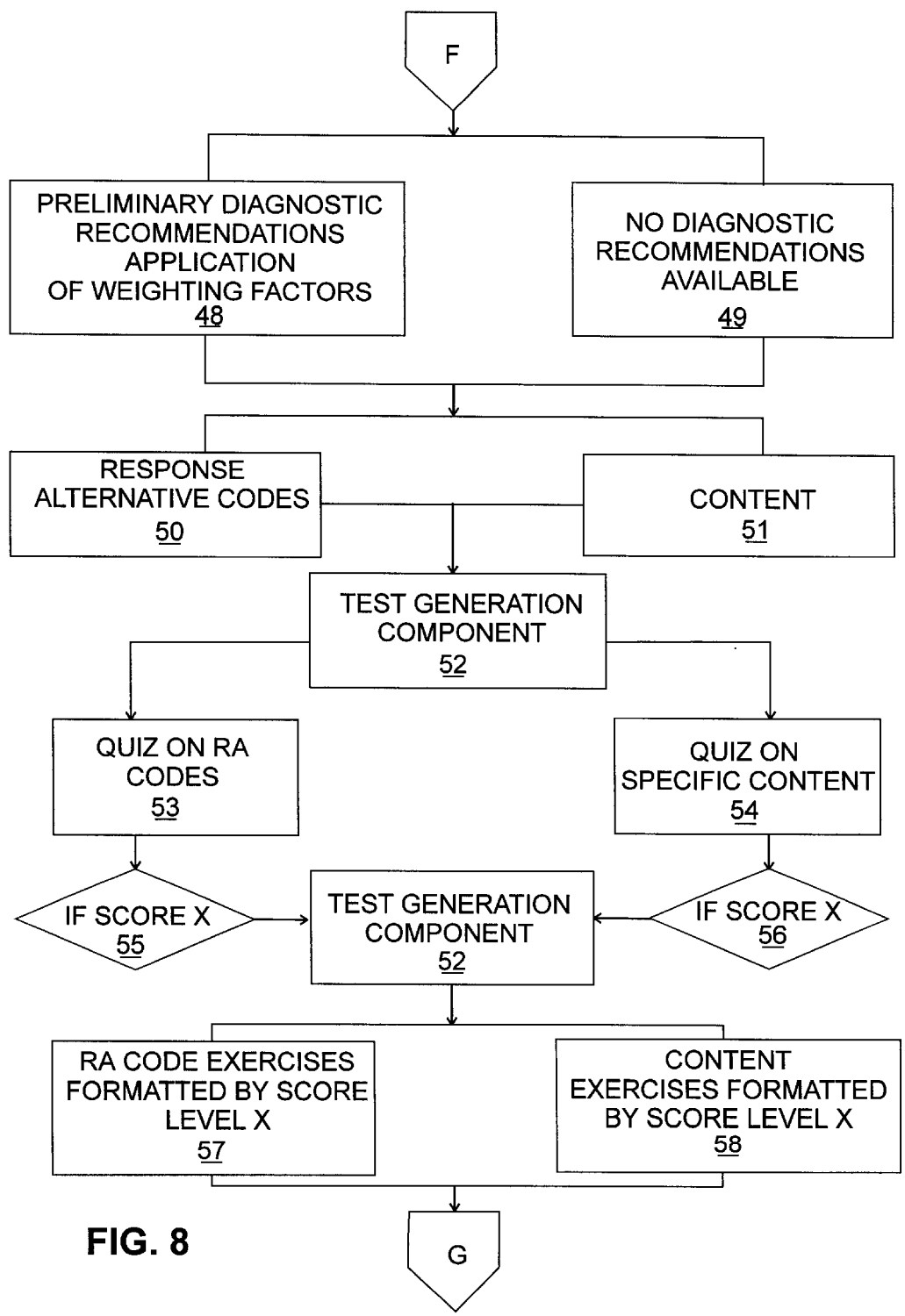
FIG. 8 illustrates a block diagram of the remediation component, wherein the interaction between the remediation component and the test generation component according to the invention is illustrated.
Figure 9:
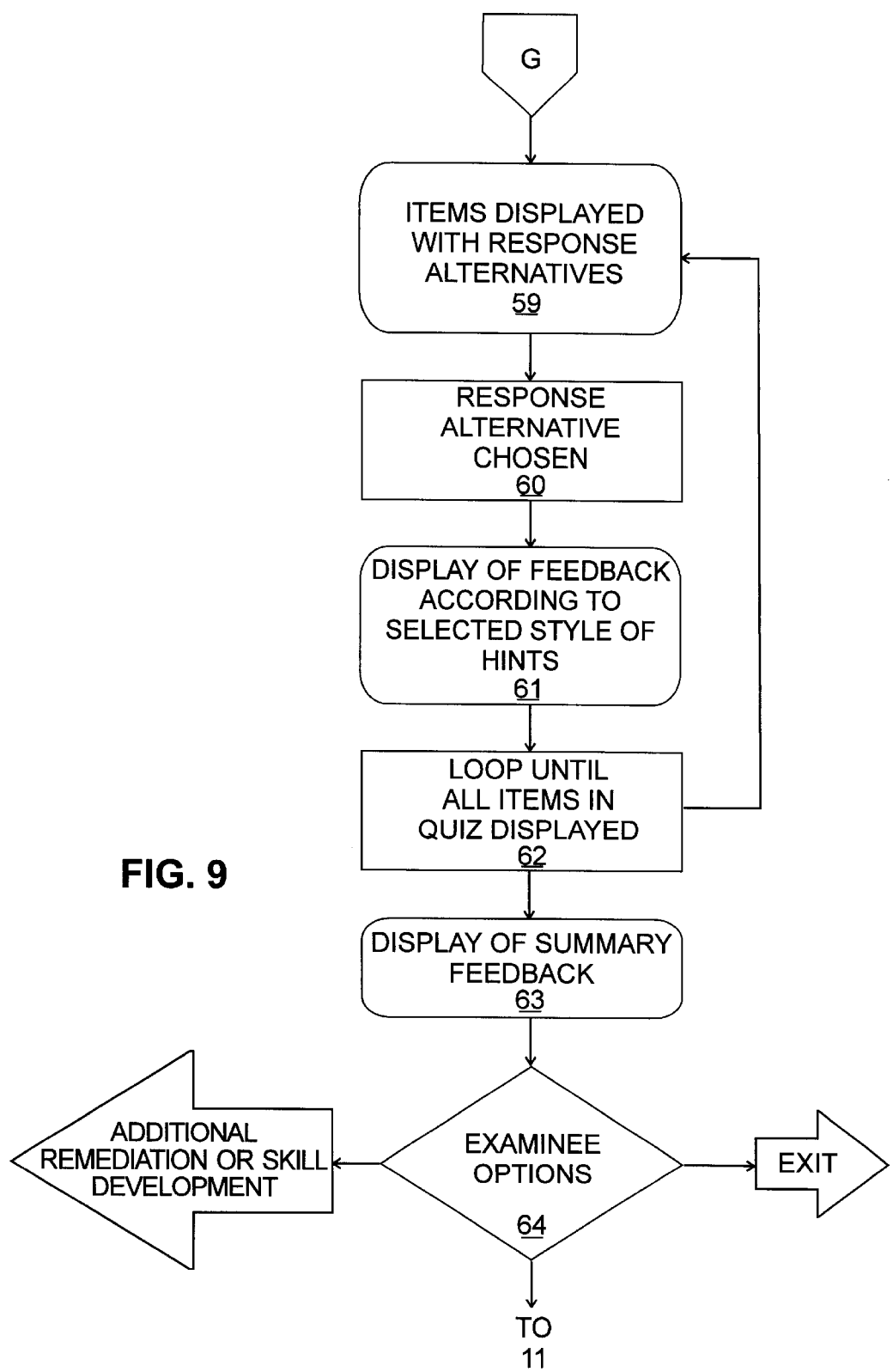
FIG. 9 illustrates a block diagram of the test generation component according to the invention.

FIGS. 8 and 9 are block diagrams of the remediation component and the test generation component, and illustrate the interaction between the two components according to another embodiment of the invention. According to this embodiment, a preliminary diagnosis is confirmed by presenting the user with a subsequent quiz following a diagnostic test. For example, where a user has responded in a particular way to a set of analogies on the diagnostic test using only one or two distractor type codes (analogy type codes) then a quiz of analogy type codes is offered to develop a firm and reliable diagnosis. Following the quiz, an appropriate remedial training exercise presents the user with a set of analogies in which the various types of analogies are made explicit. Such exercises increase the user's knowledge of various types of analogical relationships.

According to another embodiment of the invention, after the preliminary diagnosis and recommendations are made 42–47, the preliminary diagnostic recommendations are combined with data from the demographic questionnaire 4, the stored response alternative codes 50, the stored information with regard to content to the applicable exam 51, and test-taking behavior (e.g., elapsed times per sub-section) to determine RA codes and/or areas of content that require further assessment 48. If data from a sample diagnostic test is not available, as in the case of a user who wants to access only the skill development portion of the program, then no diagnostic recommendations are available to structure the formation of remediation quizzes and/or exercises 49. In this case, content quizzes and exercises are structured using a pre-set format until such user data becomes available.

For example, if the RA scores for the analogies sub-section suggests an insensitivity to a number of types of analogies, a request is passed to the Test Generation component 10, 52 for a quiz 53 to assess the user's knowledge of types of relationships commonly employed in standardized tests. According to one embodiment, such a quiz 53 is selected from one of a number of predetermined quizzes, each of which is designed to test a commonly encountered deficiency in responding to analogy problems. According to another embodiment, a quiz 53 is generated by the Test Generation component 10 in response to the results from the sample diagnostic test and the demographic questionnaire 4. If the user obtains a less than satisfactory score 55, then the Test Generation Component 52 generates exercises appropriate to the user's score level 57.

According to the embodiment, where a user's deficiency is detected in his understanding of the contents of the tested material, an analogous process is employed to provide remediation with regard to the necessary content. If the preliminary diagnostic recommendation and applied weighting factors 48 indicate, for example, that a user is manifesting considerable difficulty with content (e.g., high DL scores across numerous sub-sections of a test), and appears to be susceptible to particular RA codes (e.g., codes in the specific content area of algebra) then a request is passed to the Test Generation Component 52 for a quiz to assess the user's level of knowledge in that specific content area. If a lower than satisfactory score is obtained on the quiz 56, then the Test Generation Component 52 generates exercises in the applicable content area appropriate to that score level 58. This dynamic process of recommendation and remediation permits the sequencing of content presentation according to the difficulty level most likely to increase the user's skill level.

Additionally, preliminary diagnostic recommendations for skill development in testwiseness (i.e., skills which promote higher test scores which are independent of knowledge of the content areas being tested) and/or test taking strategy (e.g., knowledge of how to approach a test, how long to take on each question, how to deconstruct items from varied content domains and respond to different item formats) are made by the program 48 and quizzes and exercises on testwiseness and test taking strategy are generated by the Test Generation Component 10, 52 according to one embodiment of the invention. Diagnosis of errors in test-taking strategy or testwiseness are based upon logical grounds and the frequency of occurrence. By way of illustration, if easy items are skipped and difficult items are attempted, a recommendation regarding a more appropriate sequence is made. Similarly, if the user's target score does not require responses to difficult items, but such items are attempted, a recommendation is made regarding the order in which items should be attempted.

Once the appropriate questions are formatted by the Test Generation Component 10, 52 for knowledge and skill development in a particular content area, with respect to particular distractor identification and awareness, or with respect to testwiseness and test taking strategy, quiz items are displayed in multiple choice format with various response alternatives 59 and the user may select from among the choices 60. If the questions are being presented in a quiz mode, no feedback is displayed until the entire quiz has been completed 61. If the questions are being presented in a training or skill development exercise mode, feedback may be displayed in a variety of user-selected modes, varying by level, timing, and provision of solution and/or answer.

According to one embodiment, the variety of hint levels ranges from minimal, in which a general statement regarding problem types is provided, to moderate, in which words, phrases, and/or numbers may be highlighted, to maximum, in which the entire solution is provided. According to another embodiment, problems solution is provided on demand or automatically after an incorrect option choice. Additionally, answers may be provided after each item, after each sub-section or after the entire test is completed. Solutions may also be provided after each item, after incorrect responses only, after a correct response if a better option was available, or at the end of test sub-section. By way of illustration, an analogy exercise might read as follows:

Item Presented: FISH:TROUT

A. OCEAN:WAVE

B. MAMMAL:WHALE

C. BIRD:AVIARY

D. ANTENNAL:INSECT

E. STAG:DOE

A minimal hint may be the statement: "Consider the relationship between the capitalized words and each of the words in the response alternatives." A moderate level hint may read: "Make a sentence such as "trout is a kind of fish" and substitute response alternative words into the sentence, remembering to reverse the order. If the result is nonsense, then eliminate that alternative." A maximum hint may be: "B. MAMMAL:WHALE".

The program loops until all questions in a quiz or exercise are presented 62, at which point the program displays a variety of summary feedback (e.g., score, areas of excellence and improvement) 63. Once all the items are presented, the user is presented with an option menu 64 that provides such choices as additional remediation or skill development 47a, additional sample diagnostic tests 11, or the ability to exit the program.

The User Interface Component 1 also manages a number of other options for personalizing the program for particular users. According to one embodiment, instructional materials are presented in multi-media style so as to optimize instruction for different user learning styles. The materials can also be presented in different font sizes, with different cursor styles, in different colors, in different locations on the screen, and with different types of music or audio accompaniment. The User Interface Component may also provide difficulty meter levels for illustrating the difficulty levels of given problems, arrow buttons for scrolling between problems, bookmarking such that a user can bookmark and return to particular items later in an exam, and an elapsed time display and pacer clock.

One skilled in the art will appreciate that the foregoing embodiments are presented for purposes of illustration and not of limitation.

We claim:

1. A computerized method for preparing a user for standardized examinations, said method comprising the steps of:
   (a) generating a diagnostic test for assessing the user's knowledge of a domain being tested, said test containing a plurality of questions, each question having a corresponding answer set, each said answer set possessing at least one correct answer and at least one incorrect answer, and one or more of said answers being respectively associated with one or more distractor error codes;
   (b) presenting a series of said questions to said user;
   (c) eliciting one of said answers from said user for each said question;
   (d) recording said user's elicited answer for each said question;
   (e) analyzing said distractor error codes associated with the elicited answer;
   (f) detecting one or more distractor error patterns from said analysis;
   (g) diagnosing a deficiency in said domain being tested based on said distractor error patterns; and
   (h) generating a remediation activity to remediate said diagnosed deficiency.

2. The method of claim 1, wherein said questions are constrained open-ended questions.

3. The method of claim 1, wherein:
   step (b) further comprises presenting said answer set associated with each said question to said user for selection by said user of one of said answers in said answer set.

4. The method of claim 1, further comprising presenting said remediation activity to said user, and tracking said user's performance with respect to said presented remediation activity.

5. The method of claim 1, further comprising soliciting demographic information from said user, and generating said remediation activity based on said demographic information.

6. The method of claim 1, wherein:
   step (a) further comprises assigning said one or more distractor error codes to identify a deficiency in testwiseness skills of said user;
   step (e) further comprises analyzing said user's selected answers to identify said deficiency in testwiseness skills based on the distractor error codes associated with said selected answers; and
   step (h) further comprises generating a remediation activity to remediate said deficiency based on said analysis.

7. The method of claim 1, wherein said diagnosis step (g) further comprises:
   (i) generating at least one additional test to confirm said diagnosis;
   (ii) presenting said additional test to said user;
   (iii) analyzing said user's responses to said additional test; and
   (iv) confirming said diagnosis.

8. The method of claim 1, further comprising (i) providing feedback to said user with respect to said remediation activity.

9. The method of claim 1, wherein said questions include questions taken from a standardized achievement test.

10. The method of claim 1, wherein said distractor error codes include distractor error codes that indicate one or more types of errors in reasoning.

11. The method of claim 1, wherein said step of generating said remediation activity (h) further comprises analyzing said user's performance on previous remediation activities.

12. A computer readable media containing computer instructions for preparing a user for standardized examinations, said computer readable media comprising:
   (a) a test generating computer code for generating a diagnostic test for assessing said user's knowledge with respect to a domain of knowledge being tested, said test containing a plurality of questions, each question having a corresponding answer set, each said answer set possessing at least one correct answer and at least one incorrect answer, and one or more of said answers being respectively associated with one or more distractor error codes;
   (b) a test display computer program code for displaying a series of said questions to said user;
   (c) an eliciting computer program code for eliciting one of said answers from said user for each said question;
   (d) a recording computer code for recording said user's elicited answer to each said question;
   (e) an analysis computer program code for analyzing the distractor error codes associated with the elicited answer;
   (f) a detecting computer program code for detecting one or more distractor error patterns from said analysis;
   (g) a diagnosis computer program code for diagnosing a deficiency in said domain being tested based on said distractor error pattern; and
   (h) a remediation generator computer program code for generating a remediation activity to remediate said deficiency.

13. The computer readable media of claim 12, wherein said questions are constrained open-ended questions.

14. The computer readable media of claim 12, wherein:
   said test display computer code (b) further comprises a computer code for presenting said answer set associated with each said question to said user for selection by said user of one of said answers in said answer set.

15. The computer readable media of claim 12, further comprising:
   (i) an interface computer code for managing said user's interaction with said media.

16. The computer readable media of claim 12, further comprising:
   (j) a presentation computer code for presenting said remediation activity to said user for completion and for tracking said user's performance with respect to said presented remediation activity.

17. The computer readable media of claim 16, wherein said presentation computer code (j) further comprises:
   (k) a user selection computer code for presenting said remediation activity to said user in a manner selected by said user.

18. The computer readable media of claim 12, further comprising:
   (l) a demographic computer code for soliciting demographic information from said user; and
   (m) a remediation tailoring computer code for generating said remediation activity based on said demographic information.

19. The computer readable media of claim 12, wherein said distractor error codes include error codes for identifying a deficiency in testwiseness skills of said user, and wherein said remediation generator computer code (h) further comprises:

(n) a second analysis computer code for analyzing said user's selected answers to identify said deficiency in testwiseness skills based on the distractor error codes and test taking behavior indicators associated with said selected answers; and (o) a second remediation generator computer code for generating a remediation activity to remediate said deficiency based on said analysis.

20. The computer readable media of claim 12, wherein said diagnosis computer program code (g) further comprises:

(p) an assessment test generating computer program code for generating at least one additional test to confirm said diagnosis;

(q) an assessment test presentation computer code for presenting said additional test to said user to obtain said user's response to said additional test;

(r) an assessment analysis computer program code for analyzing said user's response to said additional test; and (s) a confirmation computer program code for making a confirmed diagnosis based on said analysis by said assessment analysis computer code.

21. The computer readable media of claim 12, further comprising:

(t) a feedback computer code providing feedback to said user with respect to said remediation activity.

22. The computer readable media of claim 12, wherein said questions include questions taken from a test composed of standard answers.

23. The computer readable media of claim 12, wherein said distractor error codes include distractor error codes that indicate one or more types of errors in reasoning.

24. The computer readable media of claim 12, wherein said remediation generator computer code (h) generates a remediation activity based said user's performance on a previous remediation activity.

25. A diagnostic testing and remediation apparatus, said apparatus comprising:

(a) a computing device (b) an input device for receiving input from a user and connected to said computing device;

(c) an output device connected to said computing device;

(d) a memory storage device connected to said computing device, said memory storage device further comprising:

(i) a memory for storing a pool of test questions for assessing said user's knowledge of a domain being tested, each question having a corresponding answer set, each said answer set possessing at least one correct answer and at least one incorrect answer, and one or more of said answers being respectively associated with one or more distractor error codes;

(ii) a test generating computer program code for generating a diagnostic test from said pool of test questions, said diagnostic test comprising a test question subset of said pool of test questions;

(iii) a test display computer program code for displaying said diagnostic test to said user;

(iv) an eliciting computer program code for eliciting one of said answers from said user for each said question in said diagnostic test;

(v) a recording computer program code for recording said user's elicited answers to each said question;

(vi) an analysis computer program code for analyzing the distractor error codes associated with said user's elicited answers;

(vii) a detecting computer program code for detecting one or more distractor error patterns from said analyzed distractor error codes;

(viii) a diagnosis computer program code for diagnosing a deficiency in said domain being tested based on said detected distractor error pattern; and (ix) a remediation generator computer program code for generating a remediation activity to remediate said deficiency.

26. The apparatus of claim 25, wherein said questions are constrained open-ended questions.

27. The apparatus of claim 25, wherein:

said test display computer code (iii) further comprises a computer code for presenting said answer set associated with each said question to said user for selection by said user of one of said answers in said answer set.

28. The apparatus of claim 25, wherein said computing device is located locally to said user.

29. The apparatus of claim 25, further comprising a communication link connecting said input device and said output device with said computing device, and wherein said computing device is a computer located remotely from said user.

30. The apparatus as recited in claim 25, wherein said memory storage device (d) further comprises:

(x) an interface computer code for managing said user's interaction with said apparatus.

31. The apparatus of claim 25, wherein said memory storage device (d) further comprises:

(xi) a demographic computer code for soliciting demographic information from said user;

(xii) a second memory for storing said demographic information; and (xiii) a remediation tailoring computer code for generating said remediation activity based on said demographic information.

32. The apparatus of claim 25, wherein said memory storage device (d) further comprises:

(xiv) a presentation computer code for presenting said remediation activity to said user for completion and for tracking said user's performance with respect to said remediation activity.

33. The apparatus of claim 25, wherein said memory storage device (d) further comprises:

(xv) a user selection computer code for presenting said remediation activity to said user in a manner selected by said user.

34. The apparatus of claim 25, wherein said memory storage device further comprises:

(xvi) a feedback computer code for providing feedback to said user with respect to said remediation activity.

35. The apparatus of claim 25, wherein said test display computer code (iii) further comprises:

(xvii) a timer display computer code for displaying a timer.

36. The apparatus of claim 35, further comprising:

(xviii) a second timer computer code for calculating an elapsed time in connection with said user's selected answers to said questions and for displaying said elapsed time.

37. The apparatus of claim 25, wherein said pool of test questions includes questions taken from a standardized achievement test.

38. The apparatus of claim 25, wherein said distractor error codes include distractor error codes that indicate one or more types of errors in reasoning.

39. The apparatus of claim 25, wherein said distractor error codes include error codes for identifying a deficiency in testwiseness skills of said user, and wherein said remediation generator computer code (ix) further comprises:

(xix) a second analysis computer code for analyzing said user's selected answers to identify said deficiency in testwiseness skills based on the distractor error codes associated with said selected answers; and (xx) a second remediation generator computer code for generating a remediation activity to remediate said deficiency based on said analysis.

40. The apparatus of claim 25, wherein said diagnosis computer code (viii) further comprises:

(xxi) an assessment test generating computer program code for generating at least one additional test to confirm said diagnosis;

(xxii) an assessment test presentation computer code for presenting said additional test to said user to obtain said user's response to said additional tests;

(xxiii) an assessment analysis computer program code for analyzing said user's response to said additional test; and (xxiv) a confirmation computer program code for making a confirmed diagnosis based on said analysis by said assessment analysis computer code.

41. A computerized standardized test preparation apparatus, said apparatus comprising:

(a) means for generating a diagnostic test for assessing a user's knowledge of a domain being tested, said test containing a plurality of questions, each question having a corresponding answer set, each said answer set possessing at least one correct answer and at least one incorrect answer, and one or more of said answers being respectively associated with one or more distractor error codes;

(b) means for presenting a series of said questions to the user;

(c) means for eliciting one of said answers from said user for each said question;

(d) means for recording said user's selected answer to each said question;

(e) means for analyzing said distractor error codes associated with the elicited answer;

(f) means for detecting one or more distractor error patterns based on said analyzed distractor error codes;

(g) means for diagnosing a deficiency based on said error pattern in said domain being tested based on said distractor error patterns; and (h) means for generating a remediation activity to remediate said deficiency.

* * * * *